US010677102B2

(12) United States Patent
Laskowski et al.

(10) Patent No.: US 10,677,102 B2
(45) Date of Patent: Jun. 9, 2020

(54) SYSTEMS AND METHODS FOR CONTROLLING MACHINERY STRESS VIA TEMPERATURE TRAJECTORY

(71) Applicant: General Electric Company, Schenectady, NY (US)

(72) Inventors: Benjamin David Laskowski, Greenville, SC (US); William Forrester Seely, Greenville, SC (US)

(73) Assignee: General Electric Company, Schenectady, NY (US)

(*) Notice: Subject to any disclaimer, the term of this patent is extended or adjusted under 35 U.S.C. 154(b) by 135 days.

(21) Appl. No.: 15/426,649

(22) Filed: Feb. 7, 2017

(65) Prior Publication Data

US 2018/0223697 A1 Aug. 9, 2018

(51) Int. Cl.
| | | |
|---|---|---|
| *F01K 13/02* | (2006.01) | |
| *F01K 17/04* | (2006.01) | |
| *F01K 23/10* | (2006.01) | |
| *F01D 13/00* | (2006.01) | |
| *F22B 1/18* | (2006.01) | |

(Continued)

(52) U.S. Cl.
CPC .............. *F01K 13/02* (2013.01); *F01D 13/00* (2013.01); *F01K 7/16* (2013.01); *F01K 11/02* (2013.01); *F01K 13/00* (2013.01); *F01K 13/003* (2013.01); *F01K 17/04* (2013.01); *F01K 17/06* (2013.01); *F01K 23/101* (2013.01); *F01K 23/108* (2013.01); *F22B 1/1815* (2013.01); *G01K 13/00* (2013.01); *G05D 23/1917* (2013.01); *F05D 2220/72* (2013.01); *F05D 2270/303* (2013.01); *Y02E 20/14* (2013.01); *Y02E 20/16* (2013.01)

(58) Field of Classification Search
None
See application file for complete search history.

(56) References Cited

U.S. PATENT DOCUMENTS 2,095,853 A * 10/1937 Blowney ................. F01K 13/02
60/646
3,939,328 A * 2/1976 Davis ...................... F01D 17/24
700/41

(Continued)

FOREIGN PATENT DOCUMENTS

| | | |
|---|---|---|
| DE | 3 216 298 A1 | 12/1982 |
| WO | 98/26336 A1 | 6/1998 |
| WO | 2007/090482 A1 | 8/2007 |

OTHER PUBLICATIONS

U.S. Appl. No. 15/383,859, filed Dec. 19, 2016, Benjamin David Laskowski.

(Continued)

*Primary Examiner* — Jason Lin
(74) *Attorney, Agent, or Firm* — Fletcher Yoder, P.C.

(57) ABSTRACT

A method includes determining, via a processor, a commanded temperature rate for a component of a steam turbine system. The method further includes determining, via the processor, a measured temperature rate for the component of the steam turbine system. The method additionally includes determining, via the processor, a variable multiplier based at least in part on the commanded temperature rate and the measured temperature rate. The method also includes deriving, via the processor, a multiplied temperature rate command by applying the variable multiplier to the commanded temperature rate.

20 Claims, 3 Drawing Sheets

(51) Int. Cl.
*F01K 17/06* (2006.01)
*F01K 13/00* (2006.01)
*F01K 7/16* (2006.01)
*F01K 11/02* (2006.01)
*G01K 13/00* (2006.01)
*G05D 23/19* (2006.01)

(56) References Cited

U.S. PATENT DOCUMENTS

| | | | | |
|---|---|---|---|---|
| 4,228,359 A * | 10/1980 | Matsumoto | ............ | F01D 19/02 290/40 R |
| 4,372,121 A * | 2/1983 | Sokolov | ............... | F02B 37/166 60/606 |
| 4,425,762 A | 1/1984 | Wakamatsu | | |
| 4,558,227 A | 12/1985 | Yanada et al. | | |
| 4,637,348 A * | 1/1987 | Fukayama | ............. | F22B 35/18 122/406.5 |
| 8,260,589 B1 * | 9/2012 | Kumar | ................ | G06F 17/5009 703/2 |
| 9,217,565 B2 * | 12/2015 | Beveridge | ............... | F01K 13/02 |
| 2004/0055273 A1 * | 3/2004 | Hirayama | ................ | F02C 9/28 60/39.281 |
| 2005/0085949 A1 * | 4/2005 | Kirchhof | ................ | F01D 19/02 700/290 |
| 2005/0178759 A1 * | 8/2005 | Arora | ................... | F01K 23/101 219/490 |
| 2006/0136075 A1 * | 6/2006 | Sun | ...................... | G05B 13/024 700/42 |
| 2006/0233637 A1 * | 10/2006 | Yakushi | ................. | F01D 17/00 415/13 |
| 2007/0132446 A1 * | 6/2007 | Kleinau | ................ | B60L 15/025 324/160 |
| 2008/0023175 A1 * | 1/2008 | Lehr | ........................ | B01J 8/067 165/61 |
| 2010/0089042 A1 * | 4/2010 | King | ..................... | F01N 3/0253 60/295 |
| 2011/0056201 A1 * | 3/2011 | Kluge | .................... | F01K 3/181 60/653 |
| 2012/0036852 A1 * | 2/2012 | Beveridge | ................. | F22G 5/12 60/653 |
| 2012/0040299 A1 * | 2/2012 | Beveridge | ............... | F01K 13/02 432/13 |
| 2013/0047613 A1 * | 2/2013 | Holt | ....................... | F01K 13/02 60/645 |
| 2015/0168268 A1 * | 6/2015 | Fish | ..................... | G05B 23/0235 374/142 |
| 2016/0018807 A1 * | 1/2016 | Hammerschmidt | ........................ | G05B 19/0423 327/524 |

OTHER PUBLICATIONS

Extended European Search Report and Opinion issued in connection with corresponding EP Application No. 18154612.8 dated Jul. 9, 2018.

* cited by examiner

SYSTEMS AND METHODS FOR CONTROLLING MACHINERY STRESS VIA TEMPERATURE TRAJECTORY

BACKGROUND OF THE INVENTION

The subject matter disclosed herein relates to industrial control systems, and more specifically, to controlling machinery stress using temperature trajectory.

Industrial machines, such as gas turbine systems, may provide for the generation of power. For example, the gas turbine systems typically include a compressor for compressing a working fluid, such as air, a combustor for combusting the compressed working fluid with fuel, and a turbine for turning the combusted fluid into a rotative power. For example, the compressed air is injected into a combustor, which heats the fluid causing it to expand, and the expanded fluid is forced through the gas turbine. The gas turbine may then convert the expanded fluid into rotative power, for example, by a series of blade stages. The rotative power may then be used to drive a load, which may include an electrical generator producing electrical power. The gas turbine engine may generate an amount of waste heat, which may be recovered via a steam turbine system. The steam turbine system may use steam generated via the gas turbine system exhaust (or via another source) to rotatively turn steam turbine blades. The steam turbine blades may be used to create rotative power that may then drive a second load. The second load may include a second electrical generator producing electrical power. It would be beneficial to improve machinery stress control, such as steam turbine system stress control.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes determining, via a processor, a commanded temperature rate for a component of a steam turbine system. The method further includes determining, via the processor, a measured temperature rate for the component of the steam turbine system. The method additionally includes determining, via the processor, a variable multiplier based at least in part on the commanded temperature rate and the measured temperature rate. The method also includes deriving, via the processor, a multiplied temperature rate command by applying the variable multiplier to the commanded temperature rate.

In a second embodiment, a system includes a controller configured to operatively couple to a boiler of an industrial system, the boiler fluidly coupled to a steam turbine system, wherein the controller comprises a processor. The processor is configured to determine a commanded temperature rate of a component of the steam turbine system. The processor is further configured to determine a measured temperature rate of the component of the steam turbine system. The processor is additionally configured to determine a variable multiplier based at least in part on the commanded temperature rate and the measured temperature rate. The processor is also configured to derive a multiplied temperature rate command for the industrial system by applying the variable multiplier to the commanded temperature rate.

In a third embodiment, one or more tangible, non-transitory, machine-readable media including instructions that cause a processor to determine a commanded temperature rate of a component of the steam turbine system. The processor is further configured to determine a measured temperature rate of the component of the steam turbine system. The processor is additionally configured to determine a variable multiplier based at least in part on the commanded temperature rate and the measured temperature rate. The processor is also configured to derive a multiplied temperature rate command for the industrial system by applying the variable multiplier to the commanded temperature rate.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
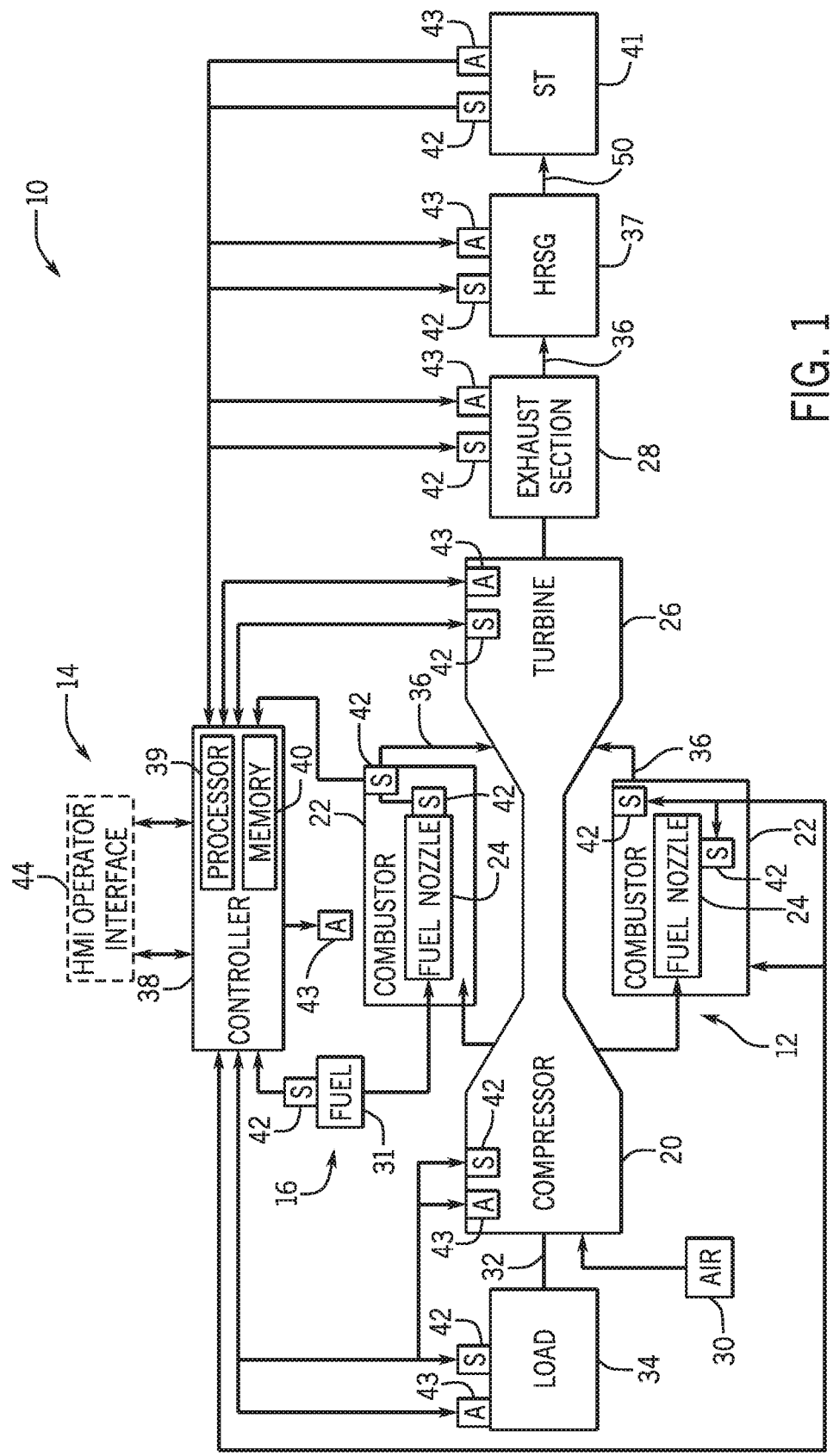
FIG. 1 is a block diagram of an embodiment of an industrial system including one or more industrial machines, in accordance with the present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An industrial control system may control a stress of an industrial system, such as a steam turbine system, by applying, for example a direct stress control. For example, a stress graph may be displayed to an operator and used for control, having an x-axis representative of a delta stress (e.g., change in stress over time) and a y-axis representative of a current total stress. The higher the y-axis value, the less change in stress (i.e., x-value) should be applied when operating the steam turbine system. The techniques described herein may alternatively or additionally control temperature rate (e.g., temperature change over time). That is, in certain embodiments, steam turbine system temperature rates may be controlled, as opposed to stress.

For example, temperature rate changes in certain steam turbine system components (e.g., shafts, casings, blades or buckets, inlets, and so no) may be controlled by controlling a flow of steam into the turbine, a steam pressure, and the like, over the course of a plant or steam turbine startup to more quickly start the systems while maintaining a desired operational life (e.g., total hours of life). Indeed, a problem to be solved may be reframed as deriving a temperature (e.g., bulk temperature) rate of change by "backing out" or otherwise deriving the desired temperature rate of change based on certain steam turbine component materials, geometry, and/or fluid dynamics. In certain embodiments, an output of a control system may then be the desired temperature rate of change to meet a constant stress objective.

Accordingly, present embodiments relate to systems and methods for controlling a temperature rate based on, for example, a desired level of stress in one or more components of the industrial system. In steam turbine system embodiments, the control may include fast starting of the steam turbine system, loading, unloading, base loading, and so on. In certain embodiments, variable temperature rate multipliers may be used, as opposed to fixed temperature rate multipliers, such that a given average temperature rate of change (e.g., bulk temperature rate of change) may be maintained over relatively smaller changes in temperature and maintaining the given average temperature rate of change despite certain variations that typically may interfere with the given average temperature rate of change. Specifically, the industrial control system embodiments described herein may use closed loop temperature rate control (CLTRC) to determine a variable rate multiplier based at least in part on the commanded temperature rate of change and a measured temperature rate of change. The variable multiplier may be applied to a temperature rate command of the industrial system, e.g., the steam turbine, to control, for example, steam flows, steam pressure, and the like.

As such, the CLTRC may account for variations due to the environment, manufacturing of the industrial system, operation of the industrial system, and the like. The industrial control system may thus enable the industrial system to achieve a given average temperature rate of change over a larger span of operational characteristics (e.g., smaller temperature changes) and maintain the given average temperature rate at a constant rate over the change in temperature. As used herein, "temperature rate of change" may refer to a change of a measure of temperature over time. For example, the "temperature rate of change" may be measured in units of temperature per unit time (e.g., Celsius/min, Celsius/sec), and the like. The techniques described herein may be applicable to other turbomachinery, such as turbo expanders, and so on.

With the foregoing in mind, an example of an industrial system is illustrated in FIG. 1. While the present embodiments are discussed with respect to a gas turbine system fluidly coupled to a steam turbine (e.g., as illustrated in FIG. 1), it should be appreciated that the industrial system 10 may, in some embodiments, include a turbo expander, a hydraulic turbine system, one or more compressor systems (e.g., aeroderivative compressors, reciprocating compressors, centrifugal compressors, axial compressors, screw compressors, and so forth), one or more electric motor systems, industrial systems including, for example, fans, extruders, blowers, centrifugal pumps, or any of various other industrial machinery that may be included in an industrial plant or other industrial facility.

As illustrated in FIG. 1, the industrial system 10 includes the gas turbine system 12, a monitoring and control system 14, and a fuel supply system 16. The gas turbine system 12 may include a compressor 20, combustion systems 22, fuel nozzles 24, a gas turbine 26, and an exhaust section 28. During operation, the gas turbine system 12 may pull air 30 into the compressor 20, which may then compress the air 30 and move the air 30 to the combustion system 22 (e.g., which may include a number of combustors). In the combustion system 22, the fuel nozzle 24 (or a number of fuel nozzles 24) may inject fuel that mixes with the compressed air 30 to create, for example, an air-fuel mixture.

The air-fuel mixture may combust in the combustion system 22 to generate hot combustion gases, which flow downstream into the turbine 26 to drive one or more turbine stages. For example, the combustion gases may move through the turbine 26 to drive one or more stages of turbine blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

The exhaust gas 36 may include thermal energy, and the thermal energy may be recovered by a heat recovery steam generation (HRSG) system 37. In combined cycle systems, such as the power plant 10, hot exhaust 36 may flow from the gas turbine 26 and pass to the HRSG 37, where it may be used to generate high-pressure, high-temperature steam 50. The steam 50 produced by the HRSG 37 may then be passed through the steam turbine system 41 for further power generation. In addition, the produced steam may also be supplied to any other processes where steam may be used, such as to a gasifier used to combust the fuel to produce the untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle. In certain embodiments, the steam turbine system 41 may be controlled via the CLTRC, for example, to provide temperature rate control that may maintain a constant stress level or a constant stress rate, as further described below.

In certain embodiments, the system 10 may also include a controller 38. The controller 38 may be communicatively coupled to a number of sensors 42, a human machine interface (HMI) operator interface 44, and one or more actuators 43 suitable for controlling components of the system 10. The actuators 43 may include valves, switches, positioners, pumps, and the like, suitable for controlling the various components of the system 10. The controller 38 may receive data from the sensors 42, and may be used to control the compressor 20, the combustors 22, the turbine 26, the exhaust section 28, the load 34, the HRSG 37, the steam turbine system 41, and so forth.

In the current embodiments, the level rate of change may be implemented by the system 10 using Closed Loop Temperature Rate Control (CLTRC). For example, the actuators 43 may include one or more valves, pumps, pressure regulators, pressure increasing systems, and so on, that may be used implement a commanded temperature rate of change to steam turbine system 41. The CLTRC may, in one embodiment, apply a variable multiplier to one or more actuators, which may be based on a desired, constant level of stress. The variable multiplier may be chosen such that the instantaneous temperature rate of change matches the commanded temperature rate of change, or in some cases, a temperature rate of change that is calculated to maintain a given average stress level (or average stress rate) over a desired range. The HMI operator interface 44 may be used to receive operator inputs that may be provided to the controller 38 (e.g., a user-specified temperature rate of change). As will be further appreciated, in response to the sensor 42 data and/or inputs received via the HMI operator interface 44, the controller 38 may control a temperature rate of change for certain components of the steam turbine system 41, such as casings, shafts, blades, and so on. By applying the variable multiplier, the CLTRC may achieve the given average temperature rate of change over a relatively larger span of operational characteristics (e.g., smaller or no stress changes, smaller temperature changes) than systems that do not implement CLTRC. Further, during startup, loading, unloading, and the like, of the steam turbine system 41, the CLTRC may follow a reference trajectory with the temperature rate which may result in faster startup times, loading times, and unloading times, while respecting a desired stress level or a desired stress rate.

In certain embodiments, the HMI operator interface 44 may be executable by one or more computer systems of the system 10. A plant operator may interface with the industrial system 10 via the HMI operator interface 44. Accordingly, the HMI operator interface 44 may include various input and output devices (e.g., mouse, keyboard, monitor, touch screen, or other suitable input and/or output device) such that the plant operator may provide commands (e.g., control and/or operational commands) to the controller 38. Further, operational information from the controller 38 and/or the sensors 42 may be presented via the HMI operator interface 44. Similarly, the controller 38 may be responsible for controlling one or more final control elements coupled to the components (e.g., the compressor 20, the turbine 26, the combustors 22, the load 34, and so forth) of the industrial system 10 such as, for example, one or more actuators 43, transducers, and so forth.

In certain embodiments, the sensors 42 may be any of various sensors useful in providing various operational data to the controller 38. For example, the sensors 42 may provide flow, pressure, and temperature of the compressor 20, speed and temperature of the turbine 26, vibration of the compressor 20 and the turbine 26, as well as flow for the exhaust gas 36, temperature, pressure and emission (e.g., $CO_2$, NOx) levels in the exhaust gas 36, carbon content in the fuel 31, temperature of the fuel 31, temperature, pressure, clearance of the compressor 20 and the turbine 26 (e.g., distance between the rotating and stationary parts of the compressor 20, between the rotating and stationary parts of the turbine 26, and/or between other stationary and rotating components), flame temperature or intensity, vibration, combustion dynamics (e.g., fluctuations in pressure, flame intensity, and so forth), load data from load 34, output power from the turbine 26, and so forth. The sensors 42 may also include temperature sensors such as thermocouples, thermistors, and the like, disposed in the steam turbine system 41. The sensors 42 may also include flow sensors such as flowmeters (e.g., differential pressure flowmeters, velocity flowmeters, mass flowmeters, positive displacement flowmeters, open channel flowmeters) and liquid level sensors such as continuous level transmitters, ultrasonic transducers, laser level transmitters, and so on, disposed in the steam turbine system 41. Additionally, the sensors 42 may include pressure sensors such as piezo-resistive pressure sensors, differential pressure sensors, optical pressure sensors, and so on, included in the steam turbine system 41. Actuators 43 may include pumps, valves, linear actuators, switches, and the like.

The controller 38 may include a processor(s) 39 (e.g., a microprocessor(s)) that may execute software programs to perform the disclosed techniques. Moreover, the processor 39 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 38 may include a memory device 40 that may store information such as control software, look up tables, configuration data, etc. The memory device 40 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

The memory device 40 may store a variety of information, which may be suitable for various purposes. For example, the memory device 40 may store machine-readable and/or processor-executable instructions (e.g., firmware or software) for the processor execution. In one embodiment, the instructions, when executed, cause the processor 39 to determine a commanded temperature rate of change of the steam turbine system 41. For example, in one embodiment, the processor 39 may determine a desired constant stress level setpoint and/or stress level rate setpoint, derive a temperature rate setpoint to achieve the desired constant level setpoint and/or stress level rate setpoint, and command one or more actuators 42 based on the temperature rate setpoint. Indeed, in certain embodiments, the instructions cause the processor 39 to determine a measured temperature rate of change of certain components in the steam turbine system 41. The temperature rate of change may refer to a temperature rate of change of temperatures of components and/or portion of components, such as shafts, casings, inlets, outlets, blades, etc., disposed in the steam turbine system 41 as describe in more detail below.

Figure 2:
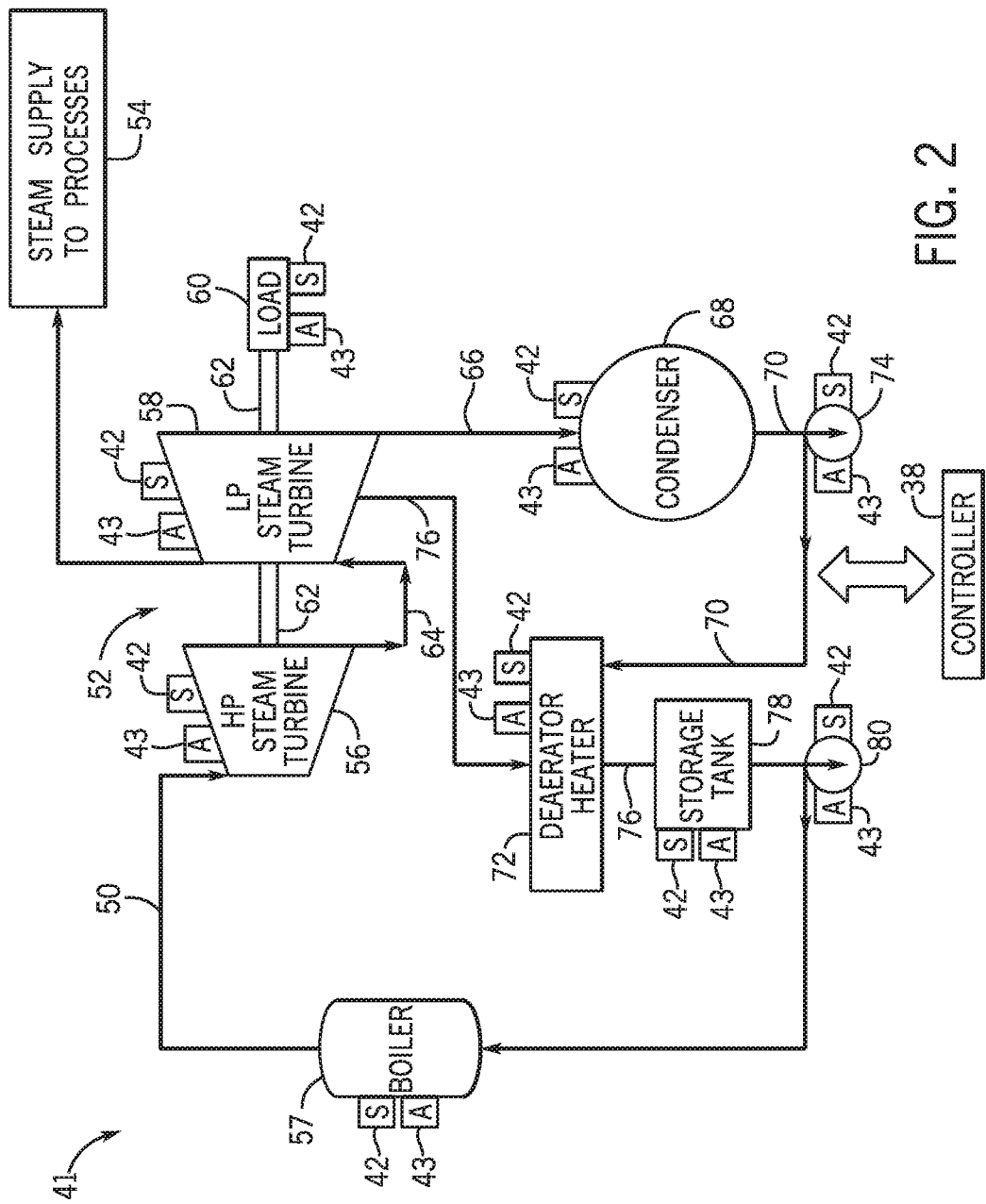
FIG. 2 is a block diagram of a steam turbine system included in the industrial system of FIG. 1, in accordance with an embodiment of the present disclosure.

FIG. 2 is a schematic block diagram illustrating an embodiment of the steam turbine system 41 of FIG. 1. It is to be noted that the depicted embodiment is an example only and various implementations of the steam turbine system 41 may be used. As depicted, the steam turbine system 41 may be configured to use steam 64 to drive a steam turbine engine 52 and/or deliver a supply of steam to various processes 54. In certain embodiments, the steam turbine system 41 may be fluidly coupled to one or more boilers 57 (e.g., steam generating boilers) included in the HRSG 37 that produces and outputs steam 50 into the steam turbine system 41.

The steam turbine system 41 includes a high pressure steam turbine section 56 (e.g., HP steam turbine 56) and/or a low pressure steam turbine section 58 (e.g., LP steam turbine 58). The steam turbine system 41 also may include a medium pressure steam turbine section (e.g., MP steam turbine) and/or other steam sections. In certain embodiments, the steam 50 output by the boiler 57 may be high-pressure, high-temperature steam that enters the HP steam turbine 56 section of the steam turbine system 41. The steam turbine system 41 may utilize the steam 50 to drive a load

60. More specifically, blades on the HP steam turbine 56 may convert steam 50 flow into rotative motion that may then rotate a shaft system 62. As energy in the steam 50 is transformed into rotative motion, the steam 50 may lose pressure and/or heat and may then be provided to the LP steam turbine 58 as steam 64. The steam 64 may have less heat and/or pressure when compared to steam 56, accordingly, the LP steam turbine 58 is more optimized for lower pressure steam, such as the steam 64.

The LP steam turbine 58 may convert the steam 64 into rotative motion of the shaft system 62 (one or more shafts, including concentric shafts). The shaft system 62 is shown coupled to the load 60, which may be an electrical generator for generating electrical power.

Further, in certain embodiments, during operation of the steam turbine system 41, the steam turbine system 41 may generate exhaust 66, which may include low-pressure steam and/or condensed water. For example, exhaust 66 from the LP steam turbine 58 may be directed into a condenser 68. The condenser 68 may utilize a cooling tower or other type of heat sink to exchange the heated water output from the condenser 68 for cooled water, which also aids in the condensation process. In certain embodiments, condensate 70 from the condenser 68 may, in turn, be directed into the boiler 57. In the illustrated embodiment, the condensate 70 from the condenser 68 is routed into a deaerator heater 72 via a hotwell pump 74, prior to being delivered to the boiler 57. The deaerator heater 72 may include a tray-type deaerator, a spray-type deaerator, or a combination thereof. For example, the deaerator heater 72 may include an enclosure having one or more spray heads (e.g., a spray header), a plurality of trays disposed in a vertically stacked arrangement, or a combination thereof. The deaerator heater 72 may include a steam section using steam 76. The heat from the steam 76 facilitates heating of the condensate 70 to the saturation temperature, thereby helping to strip out dissolved gases in the condensate 70. The dissolved gases may then exit through a vent in the enclosure of the deaerator heater 72. The deaerator heater 72 may route a treated condensate 76 to a storage tank 78 configured to store a supply of the treated heated condensate 76.

The deaerator heater 72 may be configured to remove various corrosive compounds and/or dissolved gases (e.g., oxygen, carbon dioxide, etc.) from the condensate 70 to generate the treated condensate or fluid 76 that may then be routed to the boiler 57 via a pump 80. In certain embodiments, the controller 38 may be operatively coupled to the steam turbine system 41 via the sensors 42 and the actuators 43. The controller 38 may be used to control certain aspects (or all) of the steam turbine system 41 by executing, via the processor 39 computer instructions or code stored in the memory 40. For example, the controller 38 may send or receive signals from the one or more sensors 42 disposed in the steam turbine system 41, process the signals, and derive control actions that may be transmitted to the actuators 43. The sensors 42 may measure various conditions or parameters of the steam turbine system 41, such as, but not limited to, temperatures, flow rates of fluid, pressures, speeds, clearances, or any combination thereof.

More specifically, the controller 28 may use the information received from the sensors 42 to transmit actuation signals to the actuators 43 suitable for temperature rate control. In one embodiment, the controller 28 may derive a desired stress level, such as a constant stress level. For example, during startup, a startup stress level may be maintained by controlling temperature rate for boiler 57 fluids. By controlling fluid temperature to maintain a constant stress level, life for components of the steam turbine system 41 (e.g., HP steam turbine 56, boiler 57, LP steam turbine 58, load 60, condenser 68, deaerator heater 72, pump 74, tank 78, pump 80, and/or all fluid conduits used by the steam turbine system 41) may be increased. In certain embodiments, the constant stress level may be determined by analyzing properties of components of the steam turbine system 41 41 (e.g., HP steam turbine 56, boiler 57, LP steam turbine 58, load 60, condenser 68, deaerator heater 72, pump 74, tank 78, pump 80, and/or all fluid conduits used by the steam turbine system 41), such as size, geometry (e.g., shape), thickness of walls, manufacturing materials, and/or fluid dynamics, such as fluid flow changes suitable for maintaining a desired stress level, and so on, of the components during operations. Likewise, temperature rate may be controlled, as opposed to stress, during startup, baseload operations, shutdown operations, trip operations, and the like, of the turbine engine 12.

Figure 3:
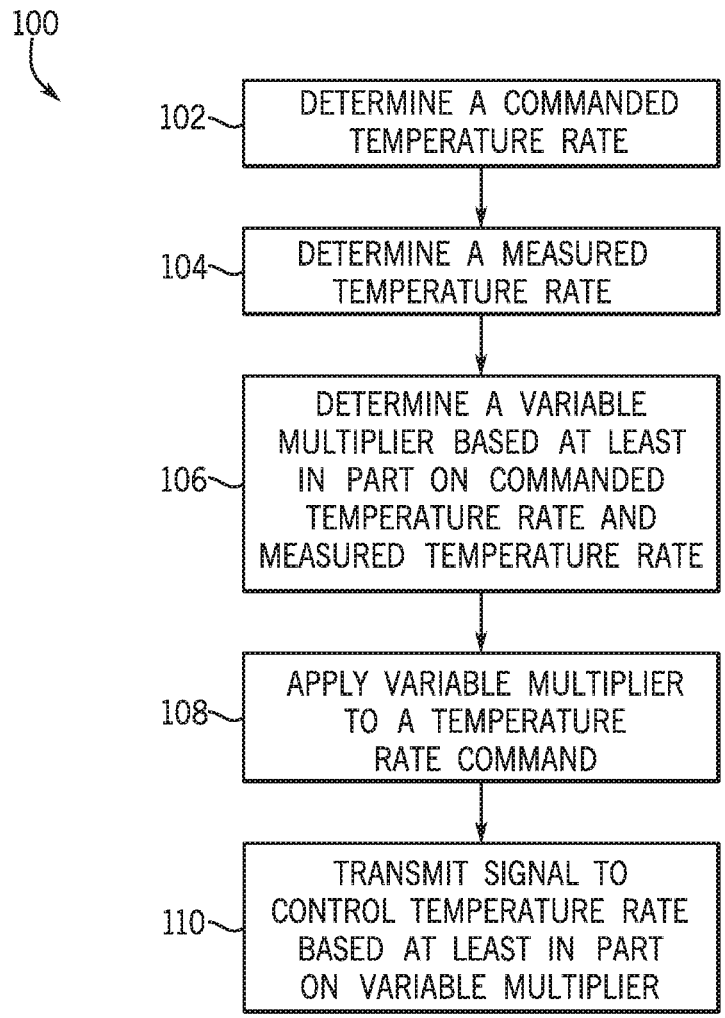
FIG. 3 is flowchart of a process for controlling a temperature rate of one or more components of the steam turbine system of FIG. 2, in accordance with an embodiment of the present disclosure.

FIG. 3 is a flowchart of a process 100 for controlling a temperature rate for one or more of the components of the steam turbine system 41 (e.g., HP steam turbine 56, boiler 57, LP steam turbine 58, load 60, condenser 68, deaerator heater 72, pump 74, tank 78, pump 80, and/or all fluid conduits used by the steam turbine system 41) shown in FIG. 2, in accordance with an embodiment of the present disclosure. The process 100 may be implemented as computer instructions executed by the processor 39 of the controller 38 and stored in the memory 40. In the depicted embodiment, the processor 39 may determine a commanded temperature rate, for example, for one or more of the components of the steam turbine system 41 (block 102). In one embodiment, the commanded temperature rate may be determined based on a stress level setpoint for one or more (or combination thereof) of the HP steam turbine 56, boiler 57, LP steam turbine 58, load 60, condenser 68, deaerator heater 72, pump 74, tank 78, pump 80, and/or all fluid conduits of the steam turbine system 41, wherein the stress level setpoint is an amount of stress to be kept at a constant level, for example, during startup operations, baseload operations, trip operations, shutdown operations, of the steam turbine system 41 and/or the gas turbine system 12. Accordingly, the process 100 may determine a constant stress level as part of the determination for the commanded temperature rate (block 102). For example, during startup, a certain constant stress level may be desired. Accordingly, the process 100 may derive the constant stress level by analyzing component size, geometry (e.g., shape), thickness of walls, manufacturing materials, and/or fluid dynamics, such as fluid flow changes suitable for preventing swell, for example, during temperature changes (e.g., startup temperature increases). Based on the desired constant stress level, the process 100 may then determine the commanded temperature rate to maintain the desired constant stress level by analyzing, for example, component size and geometry (e.g., shape), current exhaust 36 flow and temperature, fluid flows through conduits of the steam turbine system 41, and so on, to derive the commanded temperature rate.

In some embodiments, the commanded temperature rate may be temperature reference curve that was derived, as mentioned earlier, by analyzing the component (e.g., HP steam turbine 56, boiler 57, LP steam turbine 58, load 60, condenser 68, deaerator heater 72, pump 74, tank 78, pump 80, and/or all fluid conduits) so as to maintain a constant stress. In other embodiments, the temperature reference curve may enable a rising stress that stays within desired stress ranges. In yet other embodiments, the commanded temperature rate may follow a model, including a physicsbased model that may take current temperatures, pressures, flows, speeds, clearances, and so on, as input, and then derive a desired temperature rate setpoint as output. In yet other embodiments, the commanded temperature rate may be a constant rate.

Additionally or alternatively, the commanded temperature rate may be a stepped input (e.g., where the amount of temperature on the component is changed in a series of one or more steps). In such embodiments, the commanded temperature rate (e.g., commanded temperature rate setpoint) is received (or derived) as a stepped temperature rate input received at the controller 38 or from the HMI operator interface 44 or computed via the controller 38. As such, the processor 39 may determine the commanded temperature rate to be the stepped temperature rate received at the monitoring and control system 14 or from the HMI operator interface 44, or otherwise derived via the controller 38. Likewise, the HMI operator interface may be used to enter the temperature reference curve as a series of temperature points versus time, as well as the constant desired temperature rate (e.g., when using a constant temperature rate).

In some embodiments, the temperature rate setpoint may be a ramped input (e.g., where the amount of temperature rate placed on the component [e.g., HP steam turbine 56, boiler 57, LP steam turbine 58, load 60, condenser 68, deaerator heater 72, pump 74, tank 78, pump 80, and/or all fluid conduits] is varied in a ramped fashion). Successive varied temperature rate setpoint inputs may be received periodically, wherein a period between receiving consecutive updated temperature rate setpoints may be based on the monitoring and control system 14 and/or standardization.

In such a scenario of ramped input, it may be advantageous to learn the rate at which the setpoint is ramped for use as a reference. The controller 38 may include rate detection logic that determines an elapsed time between the successive temperature rate setpoints. The processor 39 may divide a difference between the successive temperature rate amounts by the elapsed time to obtain an average temperature rate. The commanded temperature rate may then be determined to be the average temperature rate. When the time between successive samples increases beyond a period threshold (e.g., a range of greater or equal to 8 seconds, 8.1 seconds, etc.), the temperature rate setpoint is assumed to be stepped, and the commanded temperature rate may be determined based on the stepped temperature rate setpoint.

The controller 38 may determine a measured temperature rate (block 104) of the component (e.g., HP steam turbine 56, boiler 57, LP steam turbine 58, load 60, condenser 68, deaerator heater 72, pump 74, tank 78, pump 80, and/or all fluid conduits) based at least in part on sensors 42. For example, sensors 42 may measure temperature rates at one or more locations of the component. Other measurements taken (block 104) may include temperature measurements of the exhaust 36, of steam (e.g., steam 50, 64, 76) produced, and/or of the fluid in conduits of the steam turbine system 41. Other measurement (block 104) may also include pressure measurements of the exhaust 36, of the steam (e.g., steam 50, 64, 76) produced, and/or of the fluid in conduits of the steam turbine system 41.

A temperature rate limit component module may set increasing and decreasing temperature rate thresholds. For example, the temperature rate limit component of a filter may set increasing and decreasing temperature rate thresholds to 1.5 times, 2 times, 3 times, or more times the determined commanded temperature rate. As such, noise that may be above a temperature rate that may be commanded (e.g., above the increasing temperature rate threshold or below the decreasing temperature rate threshold) may be detected and reduced.

In some embodiments, a trajectory-style control may be implemented to match an average measured temperature rate across the interval with the commanded temperature rate. This trajectory-style control, in some embodiments, may be selectively enabled and/or disabled. In some embodiments, by default, the trajectory-style control is enabled. An average measured temperature rate across an interval may be determined. Each time the commanded temperature rate and/or the constant stress level setpoint changes, the controller 38 may save a current temperature (or temperature rate) value and target temperature (or temperature rate) value. For example, the current temperature value and the target temperature value may be saved in the memory device 40. The difference between these values is divided by the commanded temperature rate to determine a time that elapsed during the change. A free-running timer may also be reset. A remaining temperature rate corresponding to a time between the interval and the elapsed time is divided by the difference between the interval and the elapsed time to give the average temperature rate that may be maintained for the rest of the interval. When enabled, the trajectory-style control may cause downstream logic to adjust the instantaneous or current temperature rate to meet the average measured temperature rate.

In some embodiments, the instructions may cause the processor 39 to determine a variable multiplier based at least in part on the commanded temperature rate and/or the measured temperature rate. Further, the instructions may cause the processor 39 to apply the variable multiplier to a temperature rate command. For example, in one embodiment, the variable multiplier is applied to the temperature rate command by multiplying the temperature rate command by the variable multiplier. The controller 38 may then send a signal to actuator(s) 43 of the steam turbine system 41, the gas turbine system 12, or a combination thereof, to control the temperature rate based on the multiplied temperature rate command. As mentioned above, in contrast to the fixed multiplier techniques applied to controlling stress level, by using the CLTRC techniques described herein, a variable temperature multiplier may be frequently updated, resulting in a number of efficiencies. In some embodiments, the multiplier is updated to maintain stress level at a constant value.

The controller 38 may determine (block 106) a variable multiplier based at least in part on the commanded temperature rate and the measured temperature rate. For example, the controller 38 may include a proportional-integral regulator that may calculate the variable multiplier based on the difference between the commanded temperature rate and the measured temperature rate. The measured temperature rate may include either the instantaneous measured temperature rate or the average measured temperature rate as determined above. In some embodiments, the variable multiplier may be between a minimum and a maximum threshold. For example, the variable multiplier may be between 0.75 and a ratio of a desired (e.g., maximum) permissible temperature rate to the commanded temperature rate. In some embodiments, the variable multiplier may be set to 1 when the temperature rate is within a certain deadband of the temperature rate setpoint. Further, in some embodiments, when the controller 38 is booted up, the variable multiplier may be preset to 1.

The controller 38 may apply the variable multiplier to a temperature rate command of the steam turbine 41 (block 108). In some embodiments, the multiplied temperature rate command may be further multiplied by a tuning multiplier. In some embodiments, the multiplied temperature rate command may be applied to the desired (e.g., maximum) temperature rate before being supplied to an actuator 43 (e.g., pump, valve).

The controller 38 may then send a signal to the steam turbine system 41, the gas turbine system 12, or a combination thereof, to control one or more actuators 43 based at least in part on the multiplied temperature rate command (block 110). In some embodiments, the signal may be sent to a flow regulator (e.g., one or more of the actuators 43, such as pumps, valves, restrictors, and the like) of the steam turbine 12 to regulate steam flows, for example, of steam 50, 64, 76. The actuator(s) 43 may then result in the commanded temperature rate with the variable multiplier, which may provide for a stress level or stress rate that may improve component life. The resulting control may enable a more efficient steam turbine system 41, aiding in energy recovery of the facility 10. It is to be understood that the techniques described herein may be used to control other similar systems, such as turbo-expanders.

Technical effects of the present embodiments relate to systems and methods for controlling a temperature rate in the industrial system. Specifically, the industrial control system may determine a variable multiplier based at least in part on the commanded temperature rate and a measured temperature rate, which may be applied to a temperature rate command of the industrial system, such as a steam turbine system in lieu of stress control. That is, rather than controlling stress levels or stress rates, the techniques described herein control temperature rate. In one example, temperature rate may maintain a constant stress level or a constant stress rate. The measured temperature rate may be an instantaneous or an average measured temperature rate. As such, variations due to the environment, manufacturing of the industrial system, operation of the industrial system, and the like, may be accounted for. The industrial control system may thus enable the industrial system to achieve a longer operational life.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
receiving, via a processor, a desired temperature rate for a component of a steam turbine system, wherein the desired temperate, wherein the desired temperate rate comprise a stress level setpoint configured to maintain a constant stress level for the component of the steam turbine;
determining, via the processor, a commanded temperature rate for the component of the steam turbine system based on the stress level setpoint;
determining, via the processor, a measured temperature rate for the component of the steam turbine system based on sensor inputs;
determining, always after deriving the measured temperature rate, via the processor, a variable multiplier by executing a proportional integral regulator that calculates the variable multiple based on a difference between the commanded temperature rate and the measured temperature rate; and
deriving, via the processor, a multiplied temperature rate command by applying the variable multiplier to the commanded temperature rate, wherein the variable multiplier varies between a value of less than 1, more than 1, and 1.

2. The method of claim 1, comprising transmitting, via the processor, a signal to a power production system to control the temperature rate for the component of the steam turbine system based at least in part on the multiplied temperature rate command, and wherein the power production system includes the steam turbine system.

3. The method of claim 2, wherein the signal is configured to actuate an actuator to maintain a constant stress level of the component of the steam turbine system, a constant stress rate of the component of the steam turbine system, or a combination thereof.

4. The method of claim 3, comprising, deriving, via, the processor, the constant stress level, the constant stress rate, or the combination thereof, by analzying a component size, a component geometry, a component wall thickness, a component material, applying fluid dynamics, or a combination thereof.

5. The method of claim 4, wherein deriving, via the processor, the constant stress level comprises analzying a size of the component, a geometry of the component, a wall thickness of the component, materials of the component, fluid dynamics, or the combination thereof.

6. The method of claim 1, wherein the component of the steam turbine system comprises a casing, a shaft, a boiler, a load connected to the shaft, a condenser, a deaerator heater, a pump a tank, a fluid conduit, or a combination thereof.

7. A system comprising:
a controller configured to operatively couple to a boiler of an industrial system, the boiler fluidly coupled to a steam turbine system, wherein the controller comprises a processor, wherein the processor is configured to:
receive a desired temperature rate for a component of a steam turbine system, wherein the desired temperate, wherein the desired temperate rate comprise a stress level setpoint configured to maintain a constant stress level for the component of the steam turbine;
determine a commanded temperature rate of the component of the steam turbine system based on the stress level setpoint;
determine a measured temperature rate of the component of the steam turbine system based on sensor inputs;

determine, always after deriving the measured temperature rate, a variable multiplier by executing a proportional integral regulator that calculates the variable multiple based on a difference between at least in part on the commanded temperature rate and the measured temperature rate; and derive a multiplied temperature rate command for the industrial system by applying the variable multiplier to the commanded temperature rate, wherein the variable multiplier varies between a value of less than 1, more than 1, and 1.

8. The system of claim 7, wherein the processor is configured to transmit a signal to a power production system to control the temperature rate for the component of the steam tubine system based at least in part on the multiplied temperature rate command, and wherein the power production system includes the steam turbine system.

9. The system of claim 8, wherein the signal is configured to actuate an actuator to maintain a constant stress level of the component of the steam turbine system, a constant stress rate of the component of the steam turbine system, or a combination thereof.

10. The system of claim 9, wherein the processor is configured to derive the constant stress level, the constant stress rate, or the combination thereof, by analzying a component size, a component geometry, a component wall thickness, a component material, applying fluid dynamics, or a combination thereof.

11. The system of claim 10, wherein the processor is configured to derive the constant stress level by analyzing a size of the component, a geometry of the component, a wall thickness of the component, materials of the component, fluid dynamics, or the combination thereof.

12. The system of claim 11, wherein the processor is configured to derive the constant stress level to maximize component life.

13. The system of claim 7, wherein the processor is configured to determine the commanded temperature rate based at least in part on receiving or deriving a stepped temperature rate.

14. The system of claim 7, wherein the processor is configured to determine the commanded temperature rate based at least in part on receiving or deriving a ramped temperature rate.

15. The system of claim 7, wherein the industrial system comprises a heat recovery steam generation (HRSG) system having the boiler.

16. One or more tangible, non-transitory, machine-readable media comprising instructions configured to cause a processor to:
receive a desired temperature rate for a component of a steam turbine system, wherein the desired temperate, wherein the desired temperate rate comprise a stress level setpoint configured to maintain a constant stress level for the component of the steam turbine;

determine a commanded temperature rate of the component of the steam turbine system based on the stress level setpoint;

determine a measured temperature rate of the component of the steam turbine system based on sensor inputs;

determine, always after deriving the measured temperature rate, a variable multiplier by executing a proportional integral regulator that calculates the variable multiple based on a difference between the commanded temperature rate and the measured temperature rate; and derive a multiplied temperature rate command for the industrial system by applying the variable multiplier to the commanded temperature rate, wherein the variable multiplier varies between a value of less than 1, more than 1, and 1.

17. The one or more machine-readable media of claim 16, comprising instructions configured to cause the processor to transmit a signal to a power production system to control the temperature rate for the component of the steam tubine system based at least in part on the multiplied temperature rate command, and wherein the power production system includes the steam turbine system.

18. The one or more machine-readable media of claim 17, wherein the signal is configured to actuate an actuator to maintain a constant stress level of the component of the steam turbine system, a constant stress rate of the component of the steam turbine system, or a combination thereof.

19. The one or more machine-readable media of claim 18, wherein the instructions configured to cause the processor to actuate the actuator to maintain the constant stress level comprise instructions configured to cause the processor to analyze a component size, a component geometry, a component wall thickness, a component material, applying fluid dynamics, or a combination thereof.

20. The one or more machine-readable media of claim 16, wherein the instructions to determine the measured temperature rate comprises instructions to cause the processor to determine an average measured temperature rate.

* * * * *